United States Patent
He et al.

(10) Patent No.: US 12,284,036 B2
(45) Date of Patent: *Apr. 22, 2025

(54) DATA PROCESSING METHOD AND APPARATUS BASED ON DATA CODING, AND DEVICE

(71) Applicants: CHINA NATIONAL DIGITAL SWITCHING SYSTEM ENGINEERING & TECHNOLOGICAL R&D CENTER, Henan (CN); ZHUHAI COMLEADER INFORMATION SCIENCE & TECHNOLOGY CORP., LTD., Guangdong (CN)

(72) Inventors: Lei He, Henan (CN); Jiangxing Wu, Henan (CN); Quan Ren, Henan (CN); Hailong Ma, Henan (CN); Yiming Jiang, Henan (CN); Peng Zhang, Henan (CN); Jichao Xie, Henan (CN); Yiwei Guo, Guangdong (CN); Zhifeng Feng, Guangdong (CN)

(73) Assignees: CHINA NATIONAL DIGITAL SWITCHING SYSTEM ENGINEERING & TECHNOLOGICAL R&D CENTER, Zhengzhou (CN); ZHUHAI COMLEADER INFORMATION SCIENCE & TECHNOLOGY CORP., LTD., Zhuhai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/264,680

(22) PCT Filed: Jun. 7, 2021

(86) PCT No.: PCT/CN2021/098597
§ 371 (c)(1),
(2) Date: Aug. 8, 2023

(87) PCT Pub. No.: WO2022/170708
PCT Pub. Date: Aug. 8, 2022

(65) Prior Publication Data
US 2024/0121029 A1    Apr. 11, 2024

(30) Foreign Application Priority Data
Feb. 9, 2021    (CN) .......................... 202110179236.6

(51) Int. Cl.
*H04L 1/00*    (2006.01)

(52) U.S. Cl.
CPC .................................. *H04L 1/0061* (2013.01)

(58) Field of Classification Search
CPC ....... H04L 1/0061; H04L 1/0009; H04L 9/14; H04L 1/0041; H04L 1/0057; H04L 1/0076; H04L 1/08; G06F 11/00
See application file for complete search history.

(56) References Cited

U.S. PATENT DOCUMENTS

| 10,070,327 | B2 | 9/2018 | Yang |
| 10,296,913 | B1 | 5/2019 | Breitman |
| (Continued) | | | |

FOREIGN PATENT DOCUMENTS

| CN | 101090306 A | 12/2007 |
| CN | 103369703 A | 10/2013 |
| (Continued) | | |

OTHER PUBLICATIONS

Bin, "A Transformation Principle of Regenerated Code for Heterogeneous Distributed Storage" Modern Electronics Technique, vol. 42, No. 24, Dec. 2019; 4 pages.
(Continued)

*Primary Examiner* — Thien Nguyen
(74) *Attorney, Agent, or Firm* — Schwabe, Williamson & Wyatt, P.C.

(57) ABSTRACT

Provided in the present application are a data processing method and apparatus based on data coding, and a device. The method comprises: performing N-channel error correction coding on data to be processed that is in information to be processed, so as to obtain N pieces of coded data to be processed; by using coded meta-channel data obtained by means of error correction coding, performing redundancy processing on the coded data to be processed, so as to obtain N pieces of response data; and then performing error correction decoding on the N pieces of response data, so as to obtain processing result information of the information to be processed.

15 Claims, 4 Drawing Sheets

(56) References Cited

U.S. PATENT DOCUMENTS

| | | | |
|---|---|---|---|
| 10,700,813 | B2 | 6/2020 | Nammi |
| 2006/0156185 | A1* | 7/2006 | Zhang ............... H04L 25/14 714/758 |
| 2009/0049073 | A1* | 2/2009 | Cho ............... H04N 21/2343 |
| 2010/0122105 | A1 | 5/2010 | Arslan |
| 2011/0302583 | A1 | 12/2011 | Abadi |
| 2011/0320864 | A1 | 12/2011 | Gower |
| 2012/0089884 | A1 | 4/2012 | Kamiya |
| 2013/0294225 | A1 | 11/2013 | Zhang |
| 2018/0270015 | A1 | 9/2018 | Yokokawa |
| 2020/0336244 | A1* | 10/2020 | Shokrollahi ...... H03M 13/6561 |
| 2023/0033253 | A1 | 2/2023 | He |
| 2023/0039521 | A1 | 2/2023 | He |
| 2024/0113809 | A1 | 4/2024 | He |
| 2024/0121029 | A1 | 4/2024 | He |

FOREIGN PATENT DOCUMENTS

| | | |
|---|---|---|
| CN | 106850188 A | 6/2017 |
| CN | 110162983 A | 8/2019 |
| CN | 111339071 A | 6/2020 |
| CN | 111769903 A | 10/2020 |
| CN | 112217604 A | 1/2021 |
| CN | 112217778 A | 1/2021 |
| WO | 2010/073922 A1 | 7/2010 |

OTHER PUBLICATIONS

Ji-Yan, "A Novel Joint Source-Channel Coding Scheme for Mobile Video Delivery in Heterogeneous Wireless Networks" Chinese Journal of Computers, vol. 37, No. 22 (2014); 16 pages.

International Search Report and Written Opinion in PCT/CN2021/098597, dated Nov. 3, 2021; 11 pages including English translation.

Hailong, "Dynamic Heterogeneous Redundancy Based Router Architecture with Mimic Defenses" Journal of Cyber Security, vol. 2, No. 1, Jan. 31, 2017, chapters 2-3 (14 pages).

Jianping, "Research on the physical layer security in multihop wireless networks: A Dissertation submitted for the degree of Doctor of Philosophy" South China University of Technology, Guangzhou, CN, 111 pages including English Abstract.

Koca, et al. "Turbo Decoding of Multiple Description Source and Channel Codes" IEEE (2004); pp. 176-179.

Wang, "Modelization and Analysis of Dynamic Heterogeneous Redundant System" Concurrency and Computation: Practice and Experience, Oct. 13, 2020, 16 pages.

Ying, "Improvement on Transmission Mechanism of Dynamic Forward Error Correction Code" Journal of Southern Yangtze (Natural Science Edition), vol. 5, No. 2, Apr. 2006; 5 pages.

* cited by examiner

DATA PROCESSING METHOD AND APPARATUS BASED ON DATA CODING, AND DEVICE

CROSS-REFERENCE TO RELATED APPLICATION

The present application is a national phase entry under 35 U.S.C. § 371 of International Application No. PCT/CN2021/098597, filed Jun. 7, 2021, which designates the United States of America, which claims priority to Chinese Patent Application No. 202110179236.6, titled "DATA PROCESSING METHOD AND APPARATUS BASED ON DATA CODING, AND DEVICE", filed on Feb. 9, 2021 with the China National Intellectual Property Administration, the entire disclosures of each of these applications are hereby incorporated by reference in their entireties and for all purposes.

FIELD

The present disclosure relates to the field of information processing, and in particular, to a data processing method, apparatus and device based on data encoding.

BACKGROUND

Information and communication network technology is developing rapidly. Currently, encryption is used as a protection scheme mostly to ensure the integrity and privacy of information during transmission and processing. Due to the inevitable occurrence of security problems in an information system, the way of encrypting data with a single key cannot guarantee that information will not be tampered with and stolen during transmission and processing. In other words, the existing communication system cannot correct generalized disturbances.

SUMMARY

The present disclosure provides a method and apparatus, with the purpose of solving the problem of how to correct generalized disturbances.

To achieve the above objective, following technical solutions are provided by the present disclosure.

A data processing method based on data encoding includes:
receiving to-be-processed information, where the to-be-processed information includes to-be-processed data;
performing N-channel error correction encoding on the to-be-processed data in the to-be-processed information, to obtain N channels of heterogeneous encoded to-be-processed data, where N is an integer greater than or equal to 2;
performing N-channel redundancy processing on the N channels of heterogeneous encoded to-be-processed data according to the to-be-processed information, to obtain N channels of response data; where a processing flow of any channel of the N-channel redundancy processing includes: processing, according to the encoded meta-channel data, the encoded to-be-processed data that matches the encoded meta-channel data, where the encoded meta-channel data is generated by performing error correction encoding on pre-configured meta-channel data; and heterogeneous encoded meta-channel data is used for the N channels; and
performing error correction decoding on the N channels of response data, to obtain a processing result for the to-be-processed information.

Optionally, before performing the N-channel error correction encoding on the to-be-processed data in the to-be-processed information, the method further includes:
performing error correction encoding on meta-channel data pre-configured in an i-th channel to obtain the encoded meta-channel data to be used in the i-th channel, where i=1, 2 ... N; and
where performing N-channel error correction encoding on the to-be-processed data in the to-be-processed information includes:
performing the error correction encoding on the to-be-processed data with a scheme same as that performed on the encoded meta-channel program in the i-th channel, to obtain the encoded to-be-processed data for the i-th channel matching the encoded meta-channel data used for the i-th channel.

Optionally, the performing N-channel error correction encoding on the to-be-processed data in the to-be-processed information, to obtain N channels of heterogeneous encoded to-be-processed data includes:
performing the N-channel error correction encoding on the to-be-processed data in the to-be-processed information without changing semantics, to obtain N channels of semantically unchanged heterogeneous encoded to-be-processed data, where the encoded meta-channel data has same semantics as the meta-channel data.

Optionally, the N channels of heterogeneous encoded to-be-processed data includes:
N channels of encoded to-be-processed data with data contents satisfying at least one of: signature diversity, tag diversity, verification diversity, encryption diversity, scrambling diversity, compression diversity, transformation diversity, and compilation diversity; and/or
N channels of encoded to-be-processed data with data structures satisfying at least one of: inter-frame and intra-frame stack layout randomization, stack randomization, basic block diversity, compilation diversity, and conversion diversity of converting a stack variable to a stack.

Optionally, heterogeneity of the encoded meta-channel data for the N-channel redundancy processing includes:
data contents of the encoded meta-channel data for the N-channel redundancy processing satisfying at least one of: signature diversity, tag diversity, verification diversity, encryption diversity, scrambling diversity, compression diversity, transformation diversity, and compilation diversity; and/or
data structures of the encoded meta-channel data for the N-channel redundancy processing satisfying at least one of: inter-frame and intra-frame stack layout randomization, stack randomization, basic block diversity, compilation diversity, and conversion diversity of converting a stack variable to a stack.

Optionally, the method further includes: updating a value of N according to error information in performing the error correction decoding.

Optionally, the N channels of heterogeneous encoded to-be-processed data are dynamically heterogeneous;
the encoded meta-channel data for the N-channel redundancy processing is dynamically heterogeneous; and
the method further includes: updating a scheme of error correction encoding according to error information in performing the error correction decoding.

Optionally, the meta-channel data includes: configuration data, storage data, and intermediate data for realizing functions of the meta-channels.

Optionally, the performing error correction decoding on the N channels of response data, to obtain a processing result for the to-be-processed information includes:

decoding the N channels of response data with a scheme corresponding to a scheme of the error correction encoding, to obtain the N channels of data to be determined; and performing an error correction determination process on the N channels of data to be determined, to obtain the processing result.

A data processing apparatus based on data encoding, includes:

a structure encoding module configured to: receive to-be-processed information, perform N-channel error correction encoding on to-be-processed data in the to-be-processed information, to obtain N channels of heterogeneous encoded to-be-processed data, where N is an integer greater than or equal to 2;

encoding channels configured to: perform N-channel redundancy processing on the N channels of heterogeneous encoded to-be-processed data according to the to-be-processed information, to obtain N channels of response data; where a processing flow of any channel of the N-channel redundancy processing includes: processing, according to the encoded meta-channel data, the encoded to-be-processed data that matches the encoded meta-channel data, where the encoded meta-channel data is generated by performing error correction encoding on pre-configured meta-channel data; and heterogeneous encoded meta-channel data is used for the N channels; and an error correction decoding module, configured to: perform error correction decoding on the N channels of response data, to obtain a processing result for the to-be-processed information.

An electronic device includes a memory and a processor, where the memory is stored with a program, and the processor is configured to run the program to implement the foregoing data processing method based on data encoding.

A computer-readable storage medium having a program stored thereon, where the program, when being executed by an electronic device, implements the foregoing data processing method based on data encoding.

According to the data processing method, apparatus and device based on data encoding provided in the present disclosure, N-channel error correction encoding is performed on the to-be-processed data in the to-be-processed information, to obtain N channels of heterogeneous encoded to-be-processed data. Then redundancy processing is performed on the to-be-processed data by using encoded meta-channel data subjected to error correction encoding, to obtain N channels of response data. Error correction decoding is performed on the N channels of response data, to obtain a processing result for the to-be-processed information. Since the N channels of encoded to-be-processed data are heterogeneous, and the encoded meta-channel data for the N channels is heterogeneous, the randomness of the processing is increased. Furthermore, the error correction encoding and decoding can correct generalized disturbances in the data processing, improving the security of data processing.

BRIEF DESCRIPTION OF THE DRAWINGS

In order to illustrate technical solutions in embodiments of the present disclosure or in the conventional technology more clearly, drawings used in the description of the embodiments or the conventional technology are introduced briefly hereinafter. Apparently, the drawings described in the following illustrate some embodiments of the present disclosure; other drawings may be obtained by those ordinarily skilled in the art based on these drawings without any creative efforts.

DETAILED DESCRIPTION

The technical solutions disclosed in the embodiments of the present disclosure are applicable for data processing scenarios, and aim to correct generalized disturbances in data processing.

The technical solutions in the embodiments of the present disclosure will be described clearly and completely hereinafter in conjunction with the drawings of the embodiments of the present disclosure. Apparently, the described embodiments are only some of the embodiments of the present disclosure, rather than all embodiments. Any of other embodiments made by the person skilled in the art based on the embodiments in the present disclosure without any creative efforts, fall into the scope of the present disclosure.

Figure 1:
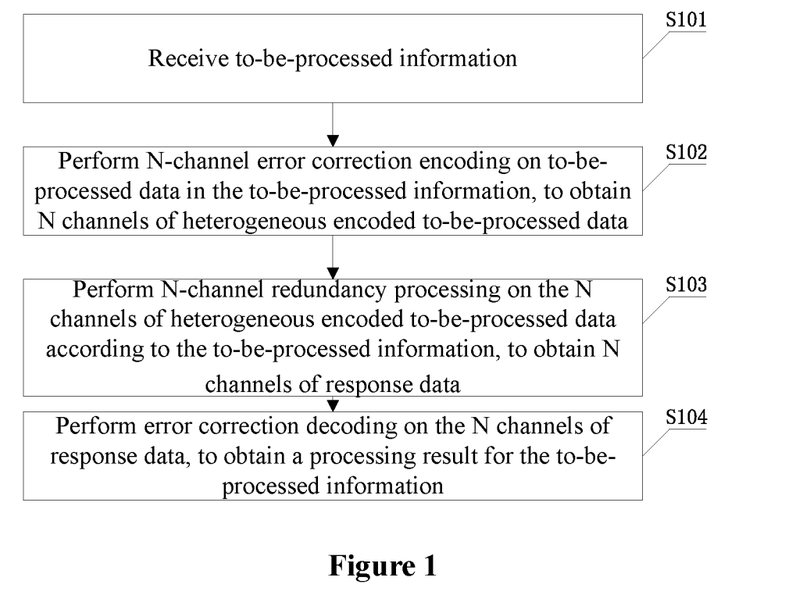
FIG. 1 is a flow chart of a data processing method based on data encoding according to an embodiment of the present disclosure.

FIG. 1 is a flow chart of a data processing method based on data encoding according to an embodiment of the present disclosure. The data processing method based on data encoding includes following steps S101 to S104.

In step S101, to-be-processed information is received.

The to-be-processed information includes to-be-processed data. Optionally, the to-be-processed information may further include an instruction.

In step S102, N-channel error correction encoding is performed on the to-be-processed data in the to-be-processed information, to obtain N channels of heterogeneous encoded to-be-processed data.

N is an integer greater than or equal to 2. Optionally, N may be an integer greater than 2 to improve the accuracy of error correction. Further, the larger N is, the stronger the error correction capability is, but the hardware and software costs are also higher, so N may be 3. In practice, a specific value of N may be configured as required, which is not limited in the present disclosure.

It is understandable that the term "heterogeneous" may be simply understood as "different". Heterogeneous error correction encoding schemes may be used to obtain the N channels of heterogeneous encoded data from the to-be-processed data in the to-be-processed information.

Specifically, the error correction encoding may include, but is not limited to: error correction encoding performed on content(s) of the data and error correction encoding performed on structures of the data. Thus the heterogeneous error correction encoding schemes may be realized.

Optionally, the N channels of heterogeneous encoded to-be-processed data include: N channels of encoded to-be-processed data with heterogeneous data contents, N channels of encoded to-be-processed data with heterogeneous data structures, or N channels of encoded to-be-processed data with heterogeneous data contents and heterogeneous data structures.

Specifically, the N channels of encoded to-be-processed data with heterogeneous data contents may satisfy at least one of the following: signature diversity, tag diversity, verification diversity, encryption diversity, scrambling diversity, compression diversity, transformation diversity, and compilation diversity.

The N channels of encoded to-be-processed data with heterogeneous data structures may satisfy at least one of the following: inter-frame and intra-frame stack layout randomization, stack randomization, basic block diversity, compilation diversity, and conversion diversity of converting a stack variable to a stack.

Optionally, for the heterogeneity of the error correction encoding schemes, N kinds of existing heterogeneous error correction encoding schemes may be used for performing the N-channel error correction encoding on the data in the to-be-processed information. Alternatively, it is also possible to customize N kinds of heterogeneous error correction encoding schemes for the N-channel error correction encoding on the data in the to-be-processed information, as long as the N channels of heterogeneous encoded data can be obtained, which is not limited in this embodiment.

In step S103, N-channel redundancy processing is performed on the N channels of heterogeneous encoded to-be-processed data according to the to-be-processed information, to obtain N channels of response data.

It is understandable that redundancy processing means that the processing in all N channels implements the same function, for example, the function of cleaning the to-be-processed data.

Similar to the heterogeneity of the encoded to-be-processed data, optionally, the heterogeneity of encoded meta-channel data used in the N-channel redundancy processing includes:

data contents of the encoded meta-channel data used in the N-channel redundancy processing satisfying at least one of: signature diversity, tag diversity, verification diversity, encryption diversity, scrambling diversity, compression diversity, transformation diversity, and compilation diversity; and/or
  data structures of the encoded meta-channel data used in the N-channel redundancy processing satisfying at least one of: inter-frame and intra-frame stack layout randomization, stack randomization, basic block diversity, compilation diversity, and conversion diversity of converting a stack variable to a stack.

In this embodiment, a processing flow in any channel of the N-channel redundancy processing includes: processing, according to encoded meta-channel data, the to-be-processed data that is matched with the encoded meta-channel data, where the encoded meta-channel data is generated by performing error correction encoding on a pre-configured meta-channel data. Encoded meta-channel data used in the N-channel redundancy processing is heterogeneous. In other words, N channels of heterogeneous encoded meta-channel data are used to process the encoded to-be-processed data for a same purpose.

It is understandable that the step S103 can be implemented by N redundant meta-channels, where the N redundant meta-channels implement the same function, each meta-channel is pre-configured with meta-channel data and a meta-channel program, and the meta-channel data and meta-channel program are configured to realize the function of the meta-channel.

Specifically, the meta-channel data may include, but is not limited to: configuration data, storage data, and intermediate data for realizing the function of the meta-channel. The intermediate data refers to data used in a process of realizing the function of the meta-channel. The storage data refers to data for a storage operation in the process of realizing the function of the meta-channel.

In this embodiment, error correction encoding is performed on the meta-channel data. It is understandable that meta-channel data configured for the N meta-channels may be the same or heterogeneous, but the encoded meta-channel data for the N meta-channels after the error correction encoding are heterogeneous. The way to implement the heterogeneity of the error correction encoding is as previously described.

In step S104, error correction decoding is performed on the N channels of response data, to obtain a processing result for the to-be-processed information.

Specifically, S104 may be implemented with any manner known in the art. For example, a decoding scheme corresponding to the error correction encoding scheme is used to decode the N channels of response data, to obtain N channels of data to be determined; and an error correction determination process is performed on the N channels of data to be determined, to obtain the processing result.

According to the method as shown in FIG. 1, the error correction encoding is performed on both the to-be-processed data and the meta-channel data, thus the randomness in processing the encoded to-be-processed data with the encoded meta-channel data is increased. Furthermore, the error correction encoding and decoding endows the capability of correcting generalized disturbances to the data processing, and the security of the data processing is improved as compared to the existing encrypting scheme.

Figure 2:
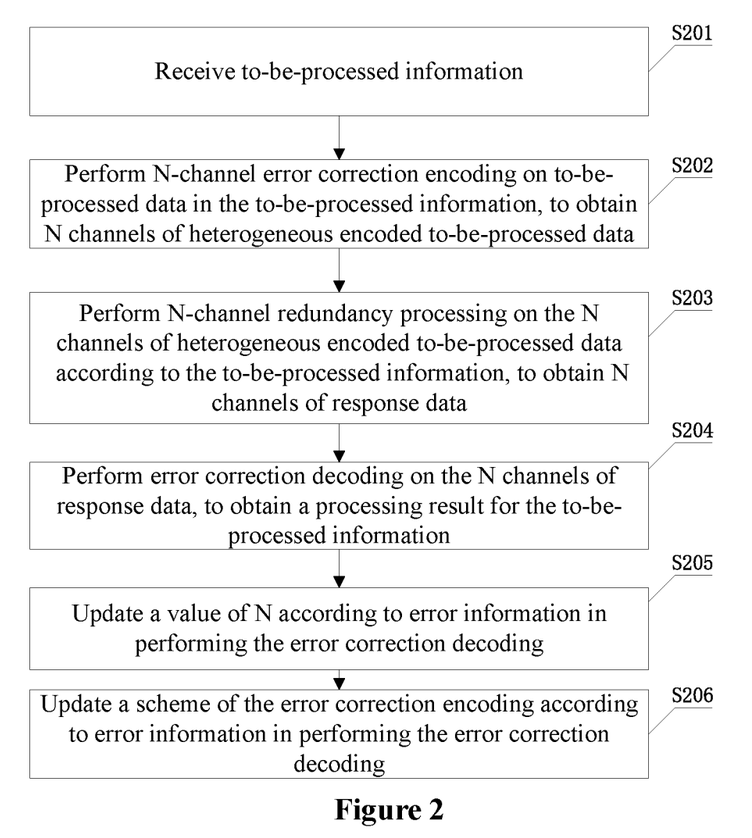
FIG. 2 is a flow chart of a data processing method based on data encoding according to another embodiment of the present disclosure.

FIG. 2 is a flow chart of a data processing method based on data encoding according to another embodiment of the present disclosure. Compared with the foregoing embodiment, steps of dynamic adjustment are added in this embodiment. The method described in this embodiment includes the following steps.

In step S201, to-be-processed information is received.

In step S202, N-channel error correction encoding is performed on to-be-processed data in the to-be-processed information, to obtain N channels of heterogeneous encoded to-be-processed data.

In step S203, N-channel redundancy processing is performed on the N channels of heterogeneous encoded to-be-processed data according to the to-be-processed information, to obtain N channels of response data.

In step S204, error correction decoding is performed on the N channels of response data, to obtain a processing result for the to-be-processed information.

In step S205, a value of N is updated according to error information in performing the error correction decoding.

Specifically, the error information includes a code word different from others, and a degree of error. The error information may be determined in any manner known in the art.

It is understandable that an example of updating the value of N is: increasing the value of N if the degree of error is high, to reduce the degree of error.

In step S206, a scheme of the error correction encoding is updated according to the error information in performing the error correction decoding.

An example of this step is: utilizing an error correction algorithm with higher error correction strength if the degree of error is high, or selecting N groups of error correction encoding algorithms with stronger heterogeneity.

It is understandable that after updating the value of N and the scheme of the error correction encoding, the scheme of the error correction decoding should be updated accordingly.

At least one of S205 and S206 is executed, and the order of S205 and S206 is not limited in the present disclosure.

In this embodiment, on the basis of redundant heterogeneous data processing, steps for dynamically adjusting the redundancy and heterogeneity are added. Thus the data processing has dynamic redundancy and heterogeneity. Therefore, randomness is further increased, and the effect of correcting disturbances is better.

It should be noted that in the above embodiments, in order to improve the security without reducing the accuracy of the result information, the principle of keeping semantics unchanged should be followed when performing the error correction encoding on the to-be-processed data in the to-be-processed information and the meta-channel data. In other words, N-channel error correction encoding without changing semantics is performed on the to-be-processed data in the to-be-processed information, to obtain the N channels of heterogeneous encoded to-be-processed data with semantics unchanged. Moreover, the encoded meta-channel data has the same semantics as the meta-channel data.

Unchanged semantics means that the data obtained by the error correction encoding does not affect the processing of the to-be-processed data. Specifically, the semantics are unchanged in two cases: the first case is that the data structure is unchanged, i.e., the type and length are unchanged; and the second case is that when the data structure is changed, the meta-channel program is changed accordingly to adapt to the change of the data structure.

In the following, the method described in the foregoing embodiments will be described in details by taking N=3 and a data processing scenario of requesting access to a certain website as an example.

Figure 3:
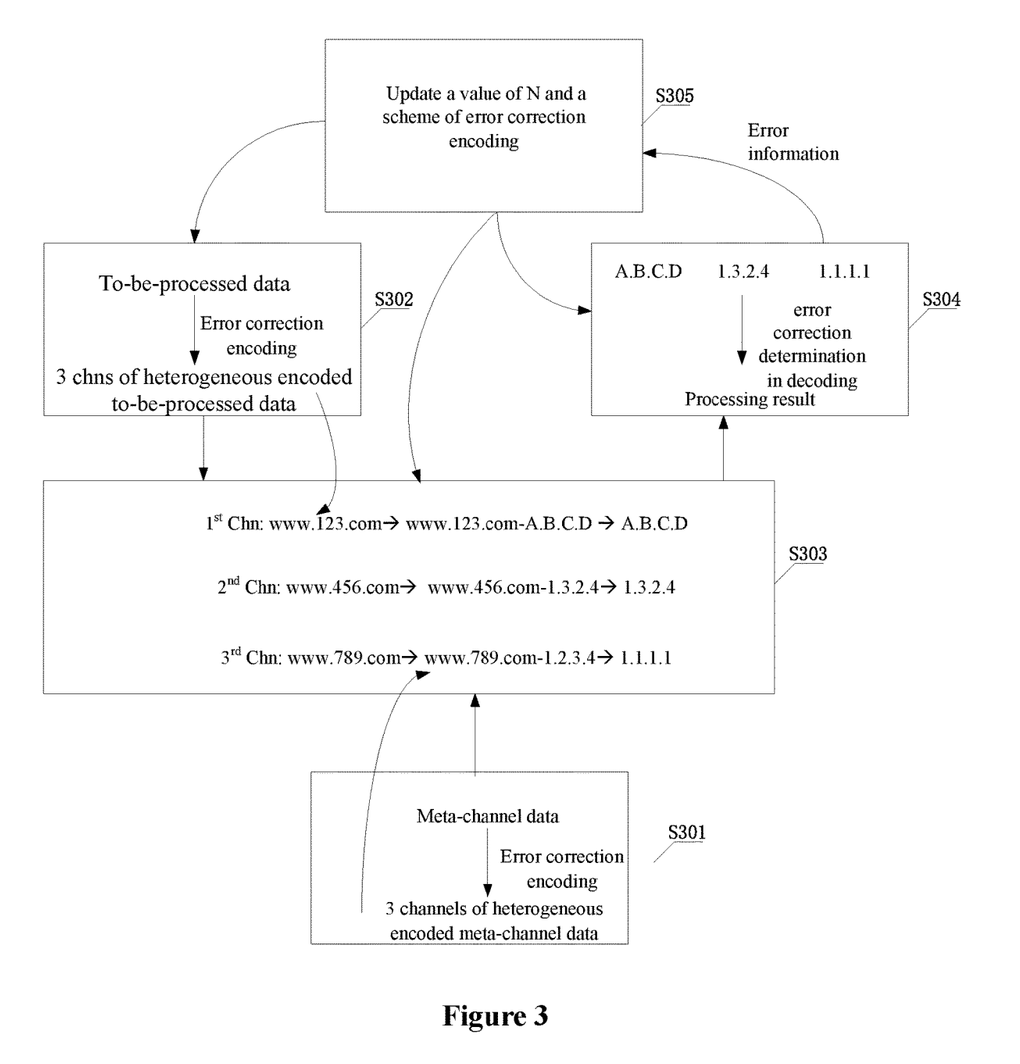
FIG. 3 is a flow chart of a data processing method based on data encoding according to yet another embodiment of the present disclosure.

FIG. 3 is a flow chart of a data processing method based on data encoding according to yet another embodiment of the present disclosure. The data processing method includes the following steps.

In step S301, error correction encoding is performed on pre-configured meta-channel data, to obtain three channels of heterogeneous encoded meta-channel data.

Specifically, in this embodiment, heterogeneous encoded meta-channel data may be realized from different aspects.

Optionally, to achieve the heterogeneity of the three channels of heterogeneous encoded meta-channel data to be used in the three-channel processing, the three channels of meta-channel data may be with at least one of the following: different signatures, different tags, different verification information, different encryption information, different scrambling schemes, different compression schemes, different transformation schemes, and different compilation schemes.

Optionally, data structures of the three channels of heterogeneous encoded meta-channel data used in the three-channel processing may satisfy at least one of the following: inter-frame and intra-frame stack layout randomization (SLR), stack randomization, basic block diversity, compilation diversity, and conversion diversity of converting a stack variable to a stack. The inter-frame and intra-frame stack layout randomization and the stack randomization are for fine-grained heterogeneity. The basic block diversity, the compilation diversity, and the conversion diversity of converting a stack variable to a stack are for coarse-grained heterogeneity.

Specifically, allowing i=1, 2, 3, the error correction encoding is sequentially performed on the meta-channel data pre-configured for the i-th channel of processing, to obtain the encoded meta-channel data to be used in the i-th channel of processing.

In this embodiment, it is assumed that a function implemented in the meta-channels is "converting a website address into a domain name", and meta-channel data is a mapping relationship between the website address and the domain name, namely "www.abc.com--1.2.3.4". The encoded meta-channel data obtained by performing error correction coding on two parts of the mapping relationship respectively is as follows:

Encoded meta-channel data to be used in a first channel of processing is: "www.123.com--A.B.C.D";

Encoded meta-channel data to be used in a second channel of processing is: "www.456.com--1.3.2.4"; and Encoded meta-channel data to be used in a third channel of processing is: "www.789.com--1.1.1.1".

It is understandable that S301 can be regarded as a preprocessing for the data processing. After the preprocessing is completed, the following data processing is performed.

In step S302, after receiving the to-be-processed information, three-channel error correction encoding is performed on the to-be-processed data in the to-be-processed information, to obtain three channels of heterogeneous encoded to-be-processed data.

In this embodiment, it is assumed that the to-be-processed information is "visit www.abc.com", in other words, the instruction is "visit", and the to-be-processed data is "www.abc.com".

Specifically, as shown in FIG. 3, the scheme of error correction encoding performed for the encoded meta-channel data in the i-th channel is performed on the to-be-processed data in the to-be-processed information, to obtain the i-th channel of encoded to-be-processed data. In this way, the encoded to-be-processed data can be identified in the process of meta-channel processing.

For the foregoing example, "www.abc.com--1.2.3.4" is encoded to get three channels of meta-channel data:

Encoded meta-channel data to be used in the first channel of processing is: "www.123.com--A.B.C.D", Encoded meta-channel data to be used in the second channel of processing is: "www.456.com--1.3.2.4"; and Encoded meta-channel data to be used in the third channel of processing is: "www.789.com--1.2.3.4".

Then the to-be-processed data is subjected to three-channel error correction encoding to be: "www.123.com", "www.456.com", and "www.789.com", respectively.

In this step, heterogeneous encoded data may be realized from different aspects. Optionally, data contents of the N channels of heterogeneous encoded to-be-processed data satisfy at least one of: signature diversity, tag diversity, verification diversity, encryption diversity, scrambling diversity, compression diversity, transformation diversity, and compilation diversity.

Data structures of the N channels of heterogeneous encoded to-be-processed data may satisfy at least one of the following: inter-frame and intra-frame stack layout randomization, stack randomization, basic block diversity, compilation diversity, and conversion diversity of converting a stack variable to a stack.

In step S303, the three channels of encoded to-be-processed data are processed, according to an instruction in the to-be-processed information, by using encoded meta-channel data respectively matching with the three channels.

Specifically, the encoded to-be-processed data that matches the encoded meta-channel data of the i-th channel is the data to be processed in the i-th channel, that is, the encoded meta-channel data to be used in the i-th channel of processing is encoded with an error correction encoding scheme same as that performed on the data to be processed in the i-th channel. In other words, the same error correction encoding scheme is applied for the same contents in the to-be-processed data and the meta-channel data.

As shown in FIG. 3, "www.123.com" matches the encoded meta-channel data "www.123.com--ABCD" in the first channel; "www.456.com" matches the encoded meta-channel data "www.456.com--1.3.2.4" in the second channel; and "www.789.com" matches the encoded meta-channel data "www.789.com--1.2.3.4" in the third channel.

Following the example above, the specific process of each channel of processing is as follows: a domain name corresponding to the encoded to-be-processed information is determined according to the instruction "visit" and the encoded meta-channel data, as response data. Assuming that errors occur in all three channels of processing, then: the response data obtained by the first channel of processing is: "A.B.C.D", the response data obtained by the second channel of processing is: "1.3.2.4" and the response data obtained by the third channel of processing is: "1.1.1.1".

In step S304, decoding is performed on the N channels of response data with a scheme corresponding to the scheme of the error correction encoding, to obtain N channels of data to be determined; and an error correction determination is performed on the N channels of data to be determined, to obtain the processing result.

Based on the above example, if there is no error in all three channels of processing, the decoded response data of each of the three channels is "1.2.3.4". If there is an error in the third channel of processing, the response data obtained is "1.2.3.5", and the processing result is "1.2.3.4" after the error correction determination process. Further, the processing result may be fed back to an execution device, and the execution device accesses the domain name "1.2.3.4" and displays the webpage.

In step S305, a value of N and a scheme of the error correction encoding are updated according to error information in performing the error correction decoding.

A specific scenario is taken as an example to illustrate the method shown in FIG. 3. DHR error correction encoding is performed on the data processing (computation, communication) process, thus the generalized disturbance errors in the processing results of the dynamically heterogeneous redundant meta-channels are random. And the error correction decoding is performed based on relative correctness axioms (nearest neighbor decoding/maximum likelihood decoding), resulting in higher security of the data processing.

Figure 4:
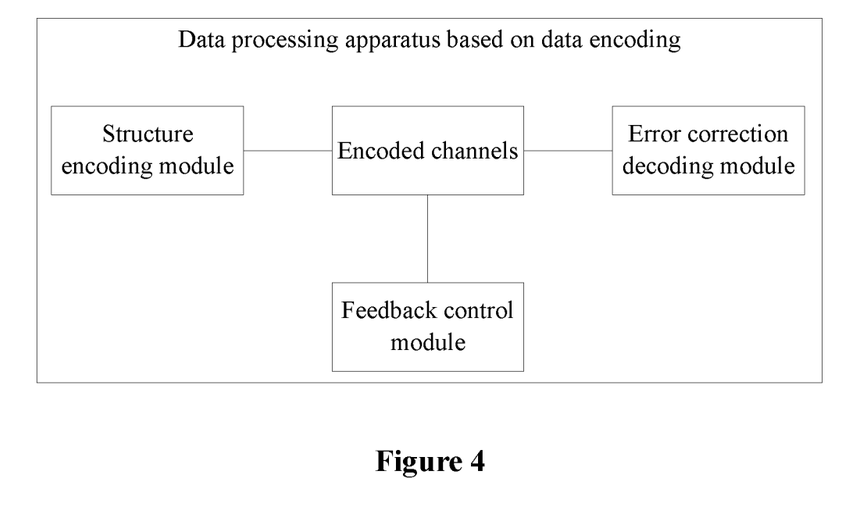
FIG. 4 is a schematic structural diagram of a data processing apparatus based on data encoding according to an embodiment of the present disclosure.

FIG. 4 is a schematic structural diagram of a data processing apparatus based on data encoding according to an embodiment of the present disclosure. The data processing apparatus based on data encoding includes: a structure encoding module, encoded channels, and an error correction decoding module. Optionally, the data processing apparatus may further include a feedback control module.

The structure encoding module is configured to: receive to-be-processed information, and perform N-channel error correction encoding on to-be-processed data in the to-be-processed information, to obtain N channels of heterogeneous encoded to-be-processed data, where N is an integer greater than or equal to 2.

The encoded channels are configured to: perform N-channel redundancy processing on the N channels of heterogeneous encoded to-be-processed data according to the to-be-processed information, to obtain N channels of response data; where a processing flow of any channel of the N-channel redundancy processing includes: processing, according to the encoded meta-channel data, the encoded to-be-processed data that matches the encoded meta-channel data, where the encoded meta-channel data is generated by performing error correction encoding on pre-configured meta-channel data, and the encoded meta-channel data used in the N-channel redundancy processing is heterogeneous from each other.

The error correction decoding module is configured to: perform error correction decoding on the N channels of response data, to obtain a processing result for the to-be-processed information.

Optionally, the feedback control module is configured to: before the structure encoding module performing the N-channel error correction encoding on the to-be-processed data in the to-be-processed information, perform error correction encoding on meta-channel data pre-configured in an i-th channel to obtain the encoded meta-channel data to be used in the i-th channel, where i=1, 2 . . . N. In this case, the structure encoding module is configured to perform the error correction encoding on the to-be-processed data with a scheme same as that performed on the encoded meta-channel data in the i-th channel, to obtain the encoded to-be-processed data of the i-th channel matching the encoded meta-channel data used in the i-th channel.

Optionally, the structure encoding module is configured to: perform the N-channel error correction encoding on the to-be-processed data in the to-be-processed information without changing semantics, to obtain N channels of semantically unchanged heterogeneous encoded to-be-processed data, where the encoded meta-channel data has the same semantics as the meta-channel data.

Optionally, the N channels of heterogeneous encoded to-be-processed data includes:
N channels of encoded to-be-processed data having with data contents satisfying at least one of: signature diversity, tag diversity, verification diversity, encryption diversity, scrambling diversity, compression diversity, transformation diversity, and compilation diversity; and/or N channels of encoded to-be-processed data with data structures satisfying at least one of the following: inter-frame and intra-frame stack layout randomization, stack randomization, basic block diversity, compilation diversity, and conversion diversity of converting a stack variable to a stack.

Optionally, the heterogeneity of encoded meta-channel data used in the N-channel redundancy processing includes:
data contents of the encoded meta-channel data for the N-channel redundancy processing satisfying at least one of: signature diversity, tag diversity, verification diversity, encryption diversity, scrambling diversity, compression diversity, transformation diversity, and compilation diversity; and/or data structures of the encoded meta-channel data for the N-channel redundancy processing satisfying at least one of the following: inter-frame and intra-frame stack layout randomization, stack randomization, basic block diversity, compilation diversity, and conversion diversity of converting a stack variable to a stack.

Optionally, N is a dynamic value, and the feedback control module is further configured to: update a value of N according to error information in performing the error correction decoding.

Optionally, the N channels of heterogeneous encoded to-be-processed data are dynamically heterogeneous;
the encoded meta-channel data for the N-channel redundancy processing is dynamically heterogeneous; and
the feedback control module is further configured to: update a scheme of the error correction encoding according to error information in performing the error correction decoding.

Optionally, the error correction decoding module is configured to: decode the N channels of response data with a scheme corresponding to a scheme of the error correction encoding, to obtain the N channels of data to be determined; and perform the error correction determination process on the N channels of data to be determined, to obtain the processing result.

The apparatus described in this embodiment is based on the principle of dynamic redundancy and heterogeneity, and has the function of correcting generalized disturbances in the data processing process, thereby improving the security of the data processing process.

An electronic device is provided according to an embodiment of the present disclosure, including: a memory and a processor; where the memory is stored with a program, and the processor is configured to run the program to implement the forgoing data processing method based on data encoding.

A computer-readable storage medium with a program stored thereon is provided according to an embodiment of the present disclosure, where the program, when being executed by an electronic device, implements the foregoing data processing method based on data encoding.

The functions described in the method of the embodiments of the present disclosure, when implemented in the form of software functional units and sold or used as independent products, the software functional units may be stored in a storage medium readable by a computing device. Based on such understanding, the technical solutions of the disclosure, part of the disclosure that contributes to existing technologies or part of the technical solutions may be embodied in the form of a computer software product. The software product is stored in a storage medium and includes several instructions for instructing a computing device (which may be personal computer, server, mobile computing device, network device or the like) to implement all of or part of the steps of the methods according to the embodiments of the disclosure. The foregoing storage medium includes various media that can store program codes, for example, USB disk, mobile hard disk drive, Read-Only Memory (ROM), Random Access Memory (RAM), magnetic disk, optical disk and the like.

The embodiments in the present disclosure are described in a progressive manner. Each of the embodiments is mainly focused on describing its differences from other embodiments, and references may be made among these embodiments with respect to the same or similar portions among these embodiments. Based on the above description of the disclosed embodiments, those skilled in the art are capable of carrying out or using the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A data processing method based on data encoding, comprising: receiving to-be-processed information, wherein the to-be-processed information comprises to-be-processed data;
performing N-channel error correction encoding on the to-be-processed data in the to-be-processed information, to obtain N channels of heterogeneous encoded to-be-processed data, wherein N is an integer greater than or equal to 2;
performing N-channel redundancy processing on the N channels of heterogeneous encoded to-be-processed data according to the to-be-processed information, to obtain N channels of response data; wherein a processing flow of any channel of the N-channel redundancy processing comprises: processing, according to encoded meta-channel data, the encoded to-be-processed data that matches the encoded meta-channel data, wherein the encoded meta-channel data is generated by performing error correction encoding on pre-configured meta-channel data; and heterogeneous encoded meta-channel data is used for the N channels; and
performing error correction decoding on the N channels of response data, to obtain a processing result for the to-be-processed information.

2. The data processing method according to claim 1, wherein before performing the N-channel error correction encoding on the to-be-processed data in the to-be-processed information, the method further comprises:
performing error correction encoding on meta-channel data pre-configured in an i-th channel to obtain the encoded meta-channel data to be used in the i-th channel, wherein i=1, 2 . . . N; and
wherein performing N-channel error correction encoding on the to-be-processed data in the to-be-processed information comprises:
performing the error correction encoding on the to-be-processed data with a scheme same as that performed on the encoded meta-channel program in the i-th channel, to obtain the encoded to-be-processed data for the i-th channel matching the encoded meta-channel data used for the i-th channel.

3. The data processing method according to claim 1, wherein the performing N-channel error correction encoding on the to-be-processed data in the to-be-processed information, to obtain N channels of heterogeneous encoded to-be-processed data comprises:
performing the N-channel error correction encoding on the to-be-processed data in the to-be-processed information without changing semantics, to obtain N channels of semantically unchanged heterogeneous encoded to-be-processed data, wherein the encoded meta-channel data has same semantics as the meta-channel data.

4. The data processing method according to claim 1, wherein the N channels of heterogeneous encoded to-be-processed data comprises:
N channels of encoded to-be-processed data with data contents satisfying at least one of: signature diversity, tag diversity, verification diversity, encryption diversity, scrambling diversity, compression diversity, transformation diversity, and compilation diversity; and/or
N channels of encoded to-be-processed data with data structures satisfying at least one of: inter-frame and intra-frame stack layout randomization, stack randomization, basic block diversity, compilation diversity, and conversion diversity of converting a stack variable to a stack.

5. The data processing method according to claim 1, wherein heterogeneity of the encoded meta-channel data for the N-channel redundancy processing comprises:
data contents of the encoded meta-channel data for the N-channel redundancy processing satisfying at least one of: signature diversity, tag diversity, verification diversity, encryption diversity, scrambling diversity, compression diversity, transformation diversity, and compilation diversity; and/or
data structures of the encoded meta-channel data for the N-channel redundancy processing satisfying at least one of: inter-frame and intra-frame stack layout randomization, stack randomization, basic block diversity, compilation diversity, and conversion diversity of converting a stack variable to a stack.

6. The data processing method according to claim 1, wherein N is a dynamic value, and the method further comprises: updating a value of N according to error information in performing the error correction decoding.

7. The data processing method according to claim 1, wherein the N channels of heterogeneous encoded to-be-processed data are dynamically heterogeneous;
the encoded meta-channel data for the N-channel redundancy processing is dynamically heterogeneous; and
the method further comprises: updating a scheme of error correction encoding according to error information in performing the error correction decoding.

8. The data processing method according to claim 1, wherein the meta-channel data comprises: configuration data, storage data, and intermediate data for realizing functions of the meta-channels.

9. The data processing method according to claim 1, wherein the performing error correction decoding on the N channels of response data, to obtain a processing result for the to-be-processed information comprises:
decoding the N channels of response data with a scheme corresponding to a scheme of the error correction encoding, to obtain the N channels of data to be determined; and
performing an error correction determination process on the N channels of data to be determined, to obtain the processing result.

10. An electronic device comprising a memory and a processor, wherein the memory is configured to store a program, and the processor is configured to run the program to:
receive to-be-processed information, perform N-channel error correction encoding on to-be-processed data in the to-be-processed information, to obtain N channels of heterogeneous encoded to-be-processed data, wherein N is an integer greater than or equal to 2;
perform N-channel redundancy processing on the N channels of heterogeneous encoded to-be-processed data according to the to-be-processed information, to obtain N channels of response data; wherein a processing flow of any channel of the N-channel redundancy processing comprises: processing, according to the encoded meta-channel data, the encoded to-be-processed data that matches the encoded meta-channel data, wherein the encoded meta-channel data is generated by performing error correction encoding on pre-configured meta-channel data; and heterogeneous encoded meta-channel data is used for the N channels; and
perform error correction decoding on the N channels of response data, to obtain a processing result for the to-be-processed information.

11. A nonvolatile computer-readable storage medium having a program stored thereon, wherein the program, when being executed by an electronic device, implements:
receiving to-be-processed information, perform N-channel error correction encoding on to-be-processed data in the to-be-processed information, to obtain N channels of heterogeneous encoded to-be-processed data, wherein N is an integer greater than or equal to 2;
performing N-channel redundancy processing on the N channels of heterogeneous encoded to-be-processed data according to the to-be-processed information, to obtain N channels of response data; wherein a processing flow of any channel of the N-channel redundancy processing comprises: processing, according to the encoded meta-channel data, the encoded to-be-processed data that matches the encoded meta-channel data, wherein the encoded meta-channel data is generated by performing error correction encoding on pre-configured meta-channel data; and heterogeneous encoded meta-channel data is used for the N channels; and
performing error correction decoding on the N channels of response data, to obtain a processing result for the to-be-processed information.

12. The electronic device according to claim 10, wherein the processor is further configured to run the program to:
perform error correction encoding on meta-channel data pre-configured in an i-th channel to obtain the encoded meta-channel data to be used in the i-th channel, wherein i=1, 2 . . . . N; and
perform the error correction encoding on the to-be-processed data with a scheme same as that performed on the encoded meta-channel program in the i-th channel, to obtain the encoded to-be-processed data for the i-th channel matching the encoded meta-channel data used for the i-th channel.

13. The electronic device according to claim 10, wherein the processor is further configured to run the program to:
perform the N-channel error correction encoding on the to-be-processed data in the to-be-processed information without changing semantics, to obtain N channels of semantically unchanged heterogeneous encoded to-be-processed data, wherein the encoded meta-channel data has same semantics as the meta-channel data.

14. The electronic device according to claim 10, wherein the processor is further configured to run the program to:
update a value of N according to error information in performing the error correction decoding.

15. The electronic device according to claim 10, wherein the processor is further configured to run the program to:
decode the N channels of response data with a scheme corresponding to a scheme of the error correction encoding, to obtain the N channels of data to be determined; and
perform an error correction determination process on the N channels of data to be determined, to obtain the processing result.

* * * * *